Figure 1:
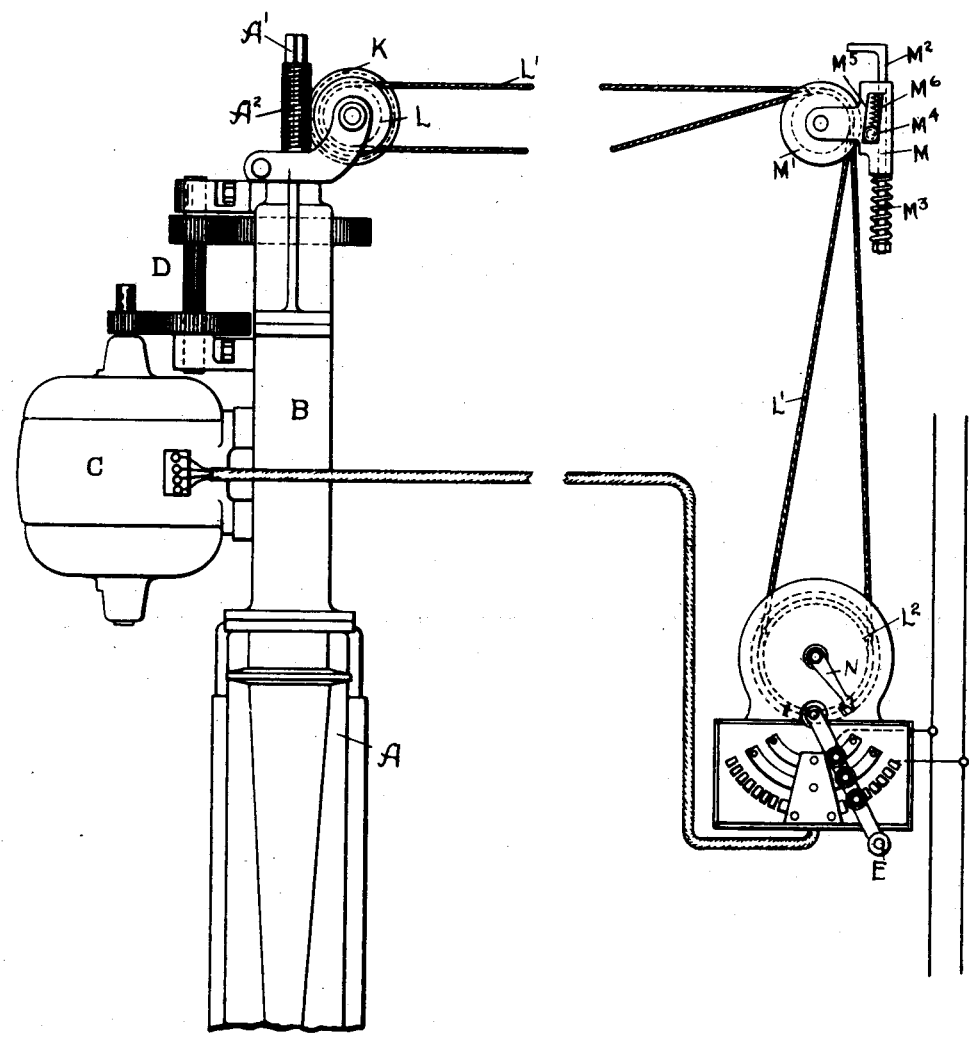

No. 713,380. Patented Nov. 11, 1902.
N. C. BASSETT.
CONTROLLING MOTORS FROM DISTANT POINTS.
(Application filed Mar. 24, 1902.)

(No Model.) 4 Sheets—Sheet 1.

WITNESSES:

INVENTOR:
Norman C. Bassett,
by Albert G. Davis
Atty.

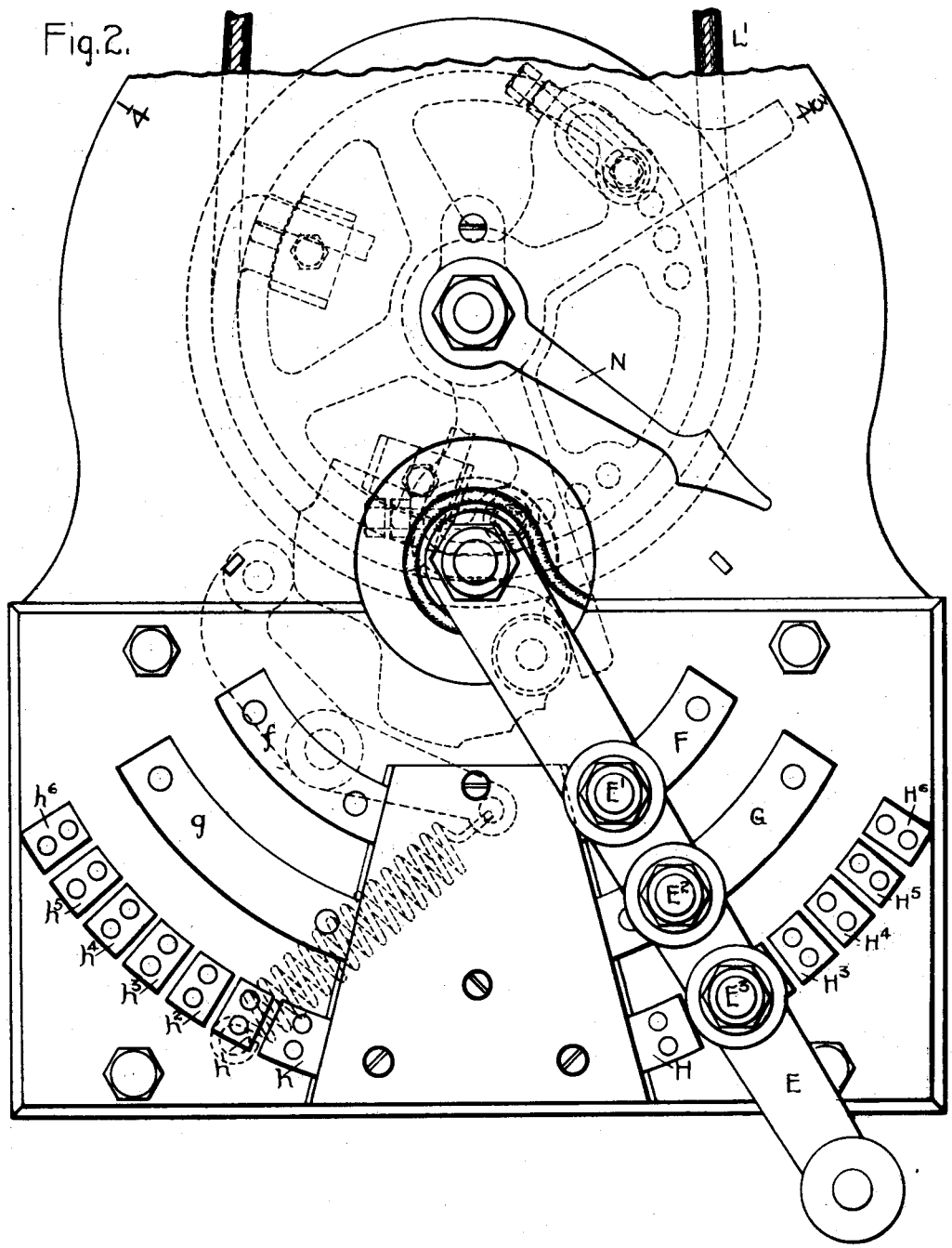

No. 713,380. Patented Nov. 11, 1902.
N. C. BASSETT.
CONTROLLING MOTORS FROM DISTANT POINTS.
(Application filed Mar. 24, 1902.)
(No Model.) 4 Sheets—Sheet 3.
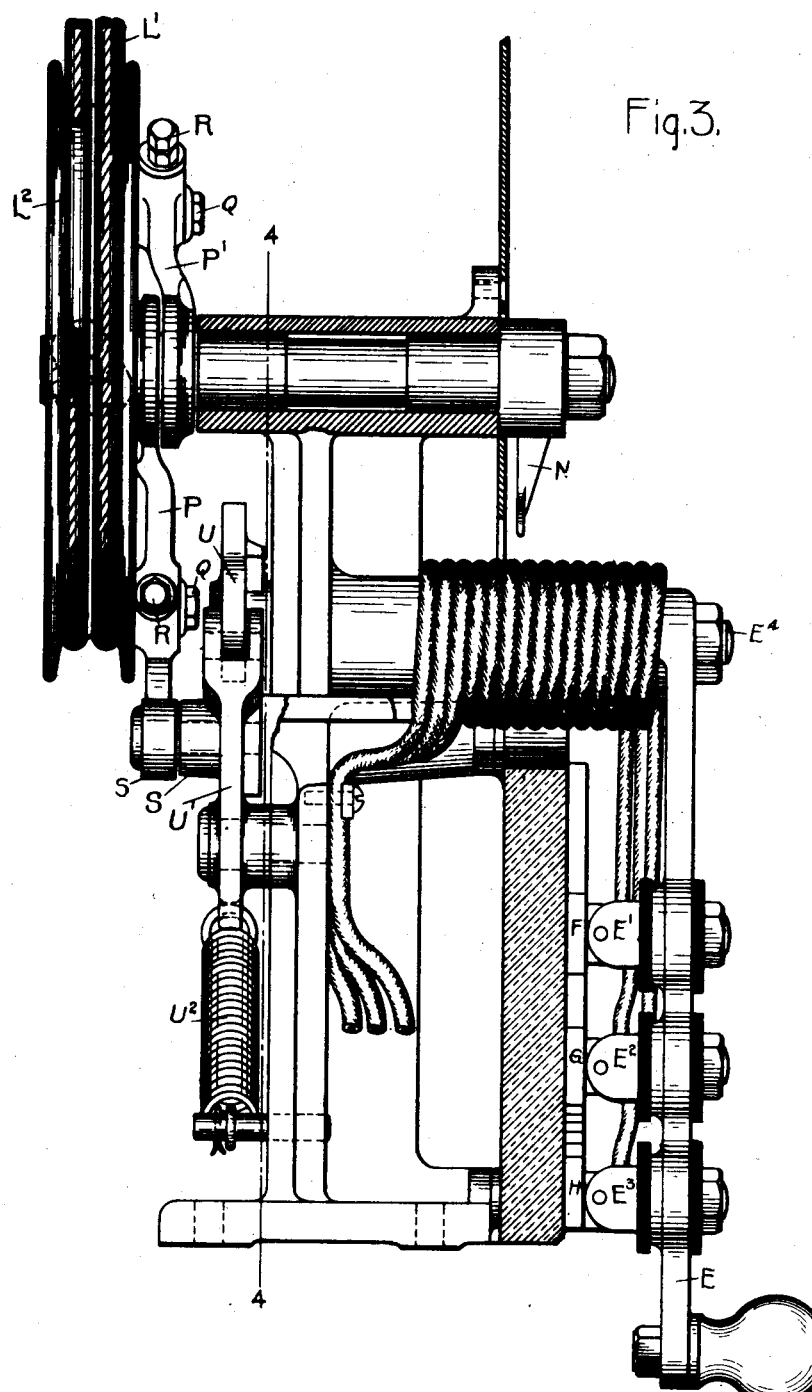
WITNESSES:
Rob't C. Chapman
Benjamin B. Hull
INVENTOR:
Norman C. Bassett
by Allen S. Lam
Atty.

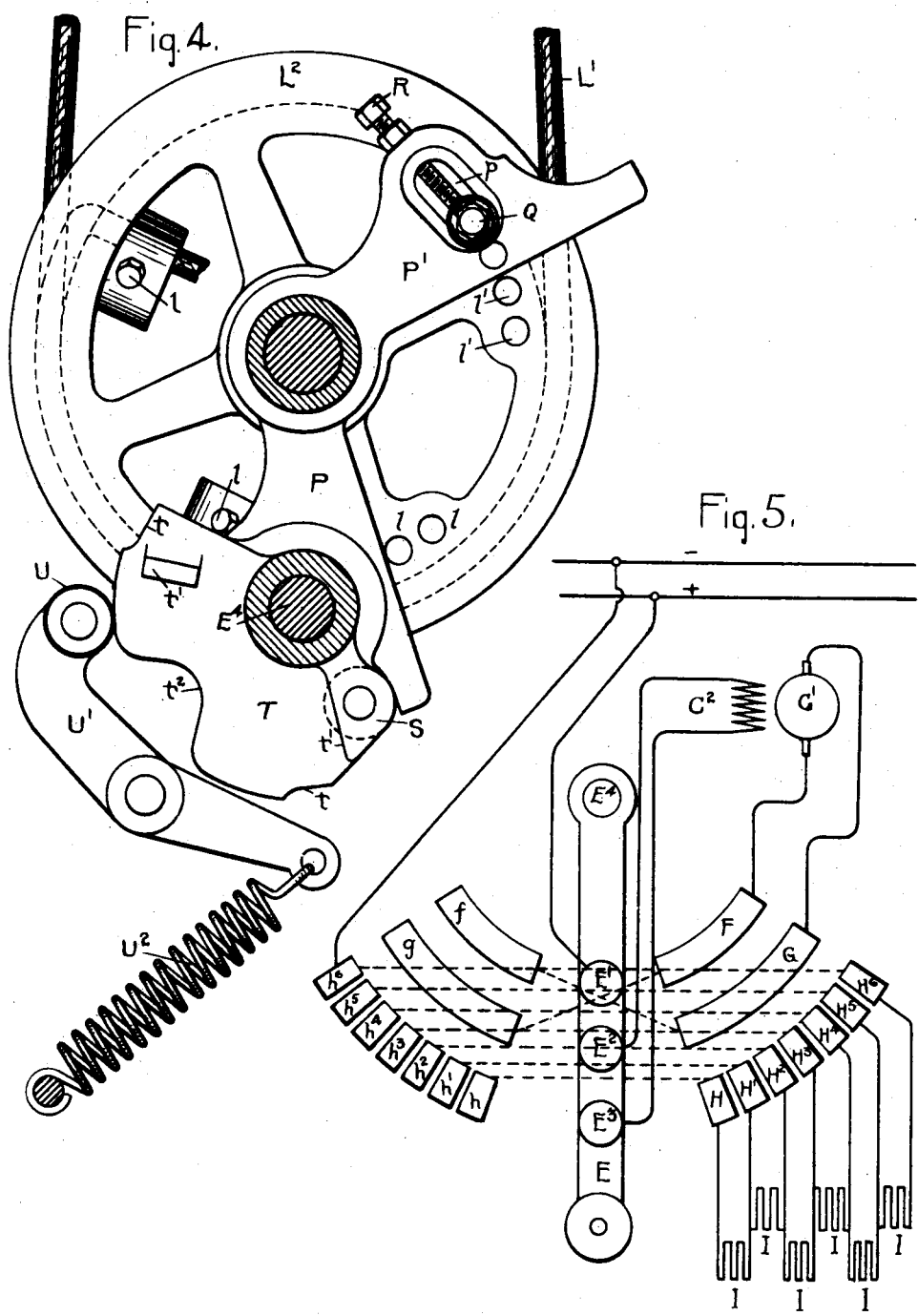

UNITED STATES PATENT OFFICE.

NORMAN C. BASSETT, OF LYNN, MASSACHUSETTS, ASSIGNOR TO GENERAL ELECTRIC COMPANY, A CORPORATION OF NEW YORK.

CONTROLLING MOTORS FROM DISTANT POINTS.

SPECIFICATION forming part of Letters Patent No. 713,380, dated November 11, 1902.

Application filed March 24, 1902. Serial No. 99,627. (No model.)

*To all whom it may concern:*

Be it known that I, NORMAN C. BASSETT, a citizen of the United States, residing at Lynn, county of Essex, State of Massachusetts, have invented certain new and useful Improvements in Controlling Motors from a Distant Point, (Case No. 2,688,) of which the following is a specification.

This invention relates to devices for controlling electric motors from a distance, and especially those used for actuating valves, such as the throttle-valves of large steam-engines. It is usually a matter of several minutes to shut off the steam and stop such an engine, and if an accident occurs giving the engineer barely time to run for his life he must leave the engine running, often to its own destruction and great injury to other machinery or even of other workmen. My invention permits him to control the steam-valve from a distant point, and if it should be necessary for him to escape even from that post of duty he can insure the prompt and automatic stopping of the engine by simply throwing a switch and leaving the apparatus to effect its usual functions.

The invention consists in the combination, with an electric motor and a moving object to which it is connected, such as a steam-valve, of a rheostatic switch controlling the motor and located at a distant point and rope or belt connections between the motor and the rheostat, whereby the latter will be automatically turned to the "off" position when the motor has completed the closing or opening of the valve.

In the accompanying drawings, Figure 1 is a side elevation of the upper part of a valve equipped with an electric motor and combined with my automatic controlling device. Fig. 2 is a front elevation, partly broken away, of the controller. Fig. 3 is a sectional side elevation of the same. Fig. 4 is a vertical section on the line 4 4, Fig. 3. Fig. 5 is a diagram of the circuits.

For the sake of convenience I have shown the invention applied to a gate or sliding valve such as is used for controlling large steam or water mains; but it will be evident that the invention is capable of many other applications—such, for instance, as the handling of doors, especially those in the water-tight bulkheads of ships.

In Fig. 1 only the upper part of the casing A of the sliding valve is shown, and that in edge view. The bonnet B surmounts the valve, and to it is fastened the electric motor C, connected by a system of back gears D with the spindle A' of the valve.

The controller by which the motor is governed is a rheostat, having a rotatable arm E, carrying three insulated contact-brushes E' E² E³, which are arranged to make contact with a series of stationary segments supported on a suitable insulating-plate. There are two sets of segments arranged symmetrically on each side of a central line, which is the off position for the arm. On the right side are the segments F G H H' H², &c., on the left-hand side the segments $f$ $g$ $h$ $h'$ $h^2$, &c. Segments F and $g$ are connected with each other and with one brush of the armature C' of the motor C. Segments G and $f$ are also connected with each other and with the other brush of the motor. The segments H and $h$ are connected, and so, too, are H' $h'$ H² $h^2$, &c. Between every two segments H H', H' H², &c., is a resistance-coil I. The brush E' on the rheostat-arm is permanently connected with the positive supply-main and makes contact with the segments F $f$. The brushes E² E³ are connected with the terminals of the series field-coil C² of the motor and make contact, respectively, with the segments G $g$ and H $h$, &c. The final segment H⁶ or $h^6$ is connected with the negative supply-main. When the arm is swung to the right from the off position, the motor starts in one direction, while it can be reversed by swinging the arm to the left from said off position. The rheostat constitutes, therefore, a reversing-controller for the motor. The movement of the arm away from the center cuts out the resistance-coils one after the other, and so speeds up the motor. It is evident, therefore, that by placing the rheostat at a distance from the motor and bunching the leads into a cable the motor can be readily started, speeded up, stopped, and reversed at will; but it may happen that circumstances, such as a conflagration or flood, will not permit the operator to remain at his post long enough to effect a closing of the valve and then to shut off the motor. To leave the current on indefinitely would soon burn out the motor after it had operated the valve and stopped. My invention therefore provides for automatically cutting out the motor when the valve has been operated. The operator has merely to throw in the rheostat and is then at liberty to run for his life, if need be. The apparatus will take care of itself. To accomplish this purpose, I provide means operating with the motor for returning the controller to its off position. The shaft of the rheostat-arm is provided with an abutment which is moved with the arm either way from a central position. Adjacent to this abutment is a wheel carrying adjustable dogs, which come in contact with the abutment when the wheel is revolved and carry the abutment and arm back to their central position. The wheel is mechanically connected with the motor, so as to be rotated thereby. The mechanical connection is preferably by means of a rope or ropes running over pulleys to another wheel driven by the motor.

In Fig. 1 there is shown a worm $A^2$, fixed on the spindle $A'$ of the valve and meshing with a worm-gear K, journaled in suitable bearings attached to the bonnet B. On the same shaft with the worm-gear is a grooved pulley L, to which is secured a wire rope $L'$, which runs to a similar pulley $L^2$ at the rheostat. The rope may extend to any reasonable distance, even a thousand feet, if desired, being carried over suitable pulleys. If desired, the rope can be kept tight by means of an automatic tightener, such as is shown in Fig. 1. This consists of a block M, carrying a pulley $M'$ and guided to slide on a bar $M^2$, which is fastened to any convenient stationary support. The block is automatically forced upward to tighten the rope by a spring $M^3$. It may be locked from returning by means of a roll $M^4$, acting on a cam-surface $M^5$ on the block. At each end of the roll is attached a spring $M^6$ to pull it up into contact with the cam-surface and the bar, so that the instant there is a downward movement of the block the roll will jam and lock the block.

Instead of a single endless wire rope I prefer to use two separate ropes, each secured to a pulley at each end. In Fig. 4 the ends of the rope are shown fastened to the pulley $L^2$ by set-screws $l$. This pulley is located adjacent to the rheostat-arm and carries on its shaft a pointer N, moving over a dial to indicate the position of the valve. Loosely mounted on the shaft adjacent to the pulley are two arms or dogs P P′, each of which can be adjusted angularly on said shaft by means of screw-studs Q, which enter a series of holes $l'$ in the pulley. The stud passes through a slot $p$ in the dog concentric with the shaft and clamps the dog to the pulley. A set-screw R in the dog bears against the stud to afford a nice adjustment of the dog. In the path of these dogs is a crank-pin S, preferably provided with an antifriction-roller $s$. The crank-pin is preferably part of a sector-wheel T, secured to the shaft $E^4$ of the rheostat-arm. When the valve is nearly open or closed, the pin is engaged by one of the dogs, and the arm will be turned back to its central off position as the pulley completes its rotation, arriving at said position when the valve is completely open or shut, and the pulley thereupon stops rotating.

The object of the sector-wheel T is threefold. At each end it has a slight depression $t$, into which a roller U on the end of a lever U′ is forced by a spring $U^2$ when the rheostat-arm is turned to its full limit either way. This serves to lock the arm against accidental displacement. The depressions are not deep enough, however, to prevent the return movement of the arm when sufficient force is applied to it either by hand or by the dog P or P′, as above set forth. The sector-wheel also carries one or more lugs $t'$, which abut against a stop or stops on the frame at the proper time to limit the throw of the arm E. In addition to this detent action the sector-wheel and the spring-actuated roller serve another purpose. When the arm is automatically returned to the central or off position, it necessarily moves at a regular speed and not very fast. In order to carry the arm quickly away from the last segment H or $h$, and thus snap out any arc that may form, the sector-wheel has at its middle a deep notch $d^2$. When the arm reaches the last contact-segment, the roller U passes the shoulder of this deep notch and by its pressure on the inclined side of the notch it forcibly throws the wheel and arm to the off position, where it locks them by resting at the bottom of the notch. If the current is thus cut off before the motor has quite closed (or opened) the valve, the operator can bring the arm forward again by hand to the first contact-segment, and thus give the motor current until it has completed its work. This operation is not interfered with by the dog P, because when the lever snaps to the center the dog is left standing at about the position in which it appears in Figs. 2 and 4; but the operator must hold the arm during this operation, since the instant he lets go it will be snapped back to the off position. It is thus apparent that the apparatus is entirely automatic in its action and that the arm cannot be left on the contacts, yet it is slightly movable to insure a further closing of the valve if the operator wishes to shut it tighter. However, when the arm has thus been brought to the center the dog prevents any extended movement thereof, so that the operator cannot throw it again to the side from which it has just come, and thus put current on the motor when it can rotate no farther. He can, however, throw the arm the other way to start the motor in a reverse direction. The device is thus an interlocking safeguard against doing the wrong thing in an emergency. There is only one thing which can be done, and that is always the right thing to do.

By using a series-wound motor with very heavy field-windings the motor will run at high speed when starting to close the valve; but as the valve nears its seat and the pressure of the steam or water on it increases the increased load will pull down the speed of the motor very considerably, so that the momentum of the armature is greatly reduced, and therefore it will not break any of the parts when the valve comes down to its seat even if the current is left on.

What I claim as new, and desire to secure by Letters Patent of the United States, is—

1. The combination with an electric motor, of a controller therefor at a distant point, a pulley rotated by the motor, a pulley-carrying means for returning the controller to the "off" position, and a rope connecting said pulleys.

2. The combination with an electric motor, of a controller therefor at a distant point, a pulley rotated by said motor, a pulley-carrying means for returning the controller to the "off" position and for preventing it from being again turned on, and a rope connecting said pulleys.

3. A controller for an electric motor having a manually-operated switch-arm, a wheel adjacent thereto operatively connected to the said motor, and a dog on said wheel for returning the switch-arm to its "off" position.

4. A controller for an electric motor, comprising a switch-arm, a crank-pin on said arm, and a wheel adjacent to the arm and carrying dogs to engage with said crank-pin.

5. A controller for an electric motor, comprising a switch-arm, a wheel adjacent to said arm, dogs angularly adjustable on said wheel, and an abutment on the arm in the path of said dogs.

6. A controller for an electric motor, comprising a switch-arm movable either way from a central "off" position, and carrying an abutment, a wheel adjacent to said arm, and dogs angularly adjustable on said wheel, either of which is adapted to come in contact with said abutment and return the arm to the "off" position and prevent it from being again turned entirely on in the direction from which it has come, until said dog has been withdrawn.

7. A controller for an electric motor, comprising a switch-arm movable either way from a central position, a sector-wheel moving with said arm and having a deep central notch, a crank-pin on said wheel, rotatable dogs adjacent to said arm and adapted to abut against said pin, and a spring-actuated lever engaging with said sector-wheel.

8. A controller for an electric motor, comprising a switch-arm movable either way from a central position, a sector-wheel moving with said arm and having depressions at each end and a deep central notch, a spring-actuated lever engaging with said sector-wheel, and means for automatically returning said arm toward its central position until said lever reaches said notch and effects a quick final movement of the arm.

9. A controller for an electric motor, comprising a switch-arm movable either way from a central position, a sector-wheel moving with said arm and having a deep central notch, a spring-actuated lever engaging with said sector-wheel, a crank-pin on said wheel, a pulley adjacent to the arm and rotatable by the motor, and dogs on said pulley adapted to abut against said crank-pin near each end of the rotation of said pulley.

10. The combination with a reversible electric motor, of a controller therefor adapted to be turned on by hand, automatic means for returning it to the "off" position as the motor reaches the end of the work, and means for compelling the motor to be reversed when the current is again turned on.

11. The combination with an electric motor, of a controller therefor adapted to be turned on by hand, automatic means for returning it to the "off" position, and means for causing a snap action at the close of its movement, and permitting a limited renewal of the circuit by hand so long as the operator retains hold of the controller.

12. The combination with an electric motor, of a reversing-controller therefor, and means operating with the motor for returning the controller to its "off" position, the said means being constructed and arranged to operate as an interlocking safeguard to prevent movement of the said controller in the wrong direction.

In witness whereof I have hereunto set my hand this 20th day of March, 1902.

NORMAN C. BASSETT.

Witnesses:
BENJAMIN B. HULL,
HELEN ORFORD.